United States Patent Office 3,248,317
Patented Apr. 26, 1966

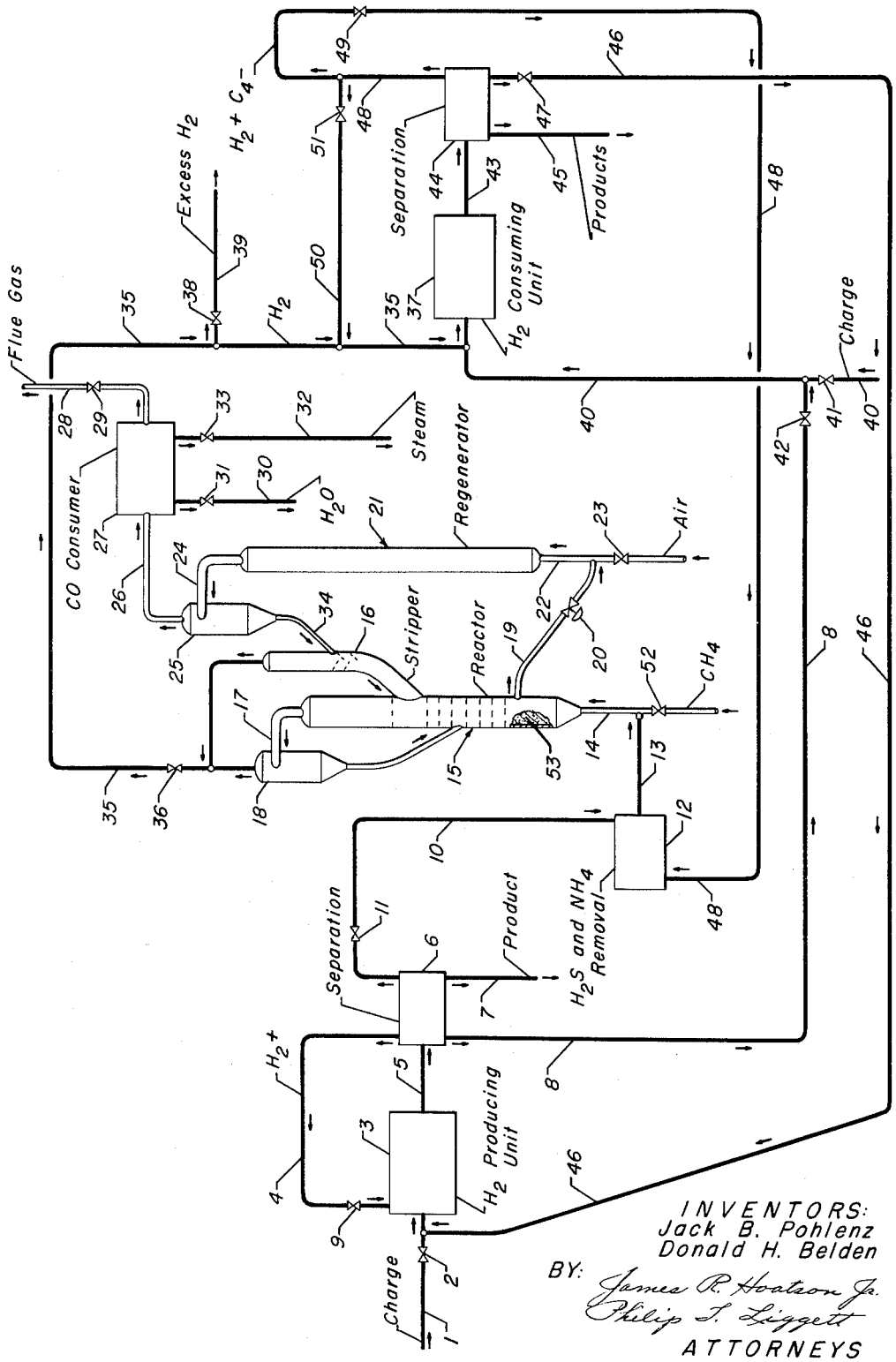

3,248,317
COMBINATION OF HYDROGEN PRODUCING
AND HYDROGEN CONSUMING UNITS
Jack B. Pohlenz, Arlington Heights, and Donald H. Belden, Prospect Heights, Ill., assignors to Universal Oil Products Company, Des Plaines, Ill., a corporation of Delaware
Filed Mar. 31, 1965, Ser. No. 444,312
1 Claim. (Cl. 208—58)

This application is a continuation-in-part of our presently pending application Serial No. 67,532, filed November 7, 1960, now Patent No. 3,189,538, June 15, 1965.

This invention relates to an improved combined system of hydrogen producing and hydrogen consuming processes wherein a high temperature cracking unit serves as means for purifying a hydrogen stream as well as for increasing the hydrogen supply in the system.

Commercial production of hydrogen has generally made use of the water-gas reaction, where carbon and steam are reacted, or alternatively the shift reaction, where carbon monoxide and steam are reacted. However, in the present improved combined operation no water or steam is utilized in the hydrogen producing or purification sections. Instead hydrogen production is effected by conventional hydrocarbon conversion processing and by the catalytic decomposition of a hydrocarbon containing stream to effect the formation of hydrogen and carbon. The hydrocarbon charge may be obtained from one or more hydrogen consuming and/or hydrogen producing hydrocarbon conversion units which are integrated with the decomposition unit. In the high temperature cracking or decomposition operation, a hydrocarbon stream contacts heated subdivided catalyst particles at a suitably controlled rate and temperature effecting the conversion of a major portion of the hydrocarbon charge to hydrogen and carbon, such that there is a resulting hydrogen rich stream substantially free of any carbon oxides. As a consequence, this type of hydrogen production system is of advantage in providing a hydrogen stream that is usable as such, without further treatment for other hydrocarbon conversion systems.

It is a principal object of the present invention to utilize a fluidized or moving bed catalytic hydrogen producing unit in a system of hydrogen producing and hydrogen consuming conversion units as a source of hydrogen and/or as a hydrogen stream purifier.

Actually, the fluidized hydrogen producing unit of the system may serve as a "balancing unit" in the combination of hydrocarbon conversion units. For example, if in the combination of processing units there is a net deficiency of hydrogen in the processing units, such deficiency may be balanced by the direct introduction of natural gas, or other hydrocarbon stream, to the fluidized hydrogen producing unit to form hydrogen by the high temperature catalytic cracking operation. If, on the other hand, there is a surplus of hydrogen within the combination of processing units, the excess may be withdrawn at a point downstream from the fluidized hydrogen producing unit, providing thereby a net hydrogen stream which is generally 85%, or higher, in hydrogen content of usable purity for most any chemical or hydrocarbon processing operation. The major contaminating component in the hydrogen rich stream comprises primarily unconverted methane, there being little if any contamination by carbon oxides. Thus, the fluidized hydrogen producing unit serves either as a hydrogen stream purifier, or a combination purifier-producer.

In a broad aspect, the present invention provides a combination conversion process which comprises subjecting a hydrocarbon charge stream to be converted to more valuable products to a hydrogen producing conversion reaction in a first conversion zone, separating from the resultant products a light normally gaseous stream and a normally liquid hydrocarbon fraction, subjecting such hydrogen containing gaseous stream to contact with subdivided heated catalyst particles in a second conversion zone at an elevated temperature and at a rate effecting the cracking of a major portion of the hydrocarbon content of such gaseous stream into hydrogen and carbon and to thereby increase the hydrogen content thereof, passing at least a part of the hydrogen from the second conversion zone to a third conversion zone together with another hydrocarbon charge stream and subjecting such charge to conversion therein a hydrogen consuming reaction, and separating from the resultant products of said third conversion zone an improved liquid product stream and a light gaseous stream.

Various combinations of hydrogen consuming and hydrogen producing conversion units may be used within the scope of the present invention with one or more types of hydrocarbon conversion reactions being carried out in conversion units at conditions providing a net production of hydrogen. For example, various hydrocarbon dehydrogenation and reforming operations effect the net production of hydrogen and in such instances, one or more of such units may provide a primary source of hydrogen usable for recycle hydrogen as well as a hydrogen source for hydrogen consumping reaction units, while the catalytic high temperature hydrocarbon decomposing unit may serve as a secondary source of hydrogen or as a hydrogen producer-purifier unit.

In a more specific embodiment, the present invention comprises a combination process for converting hydrocarbons to produce hydrogen and more valuable hydrocarbon fractions, in a manner which comprises, passing a hydrocarbon charge stream in the presence of a hydrogen containing stream to a hydrogen producing conversion zone and contacting a catalyst therein at conditions providing a net production of hydrogen and an improved hydrocarbon product stream, effecting the separation of the resultant products into a light hydrogen containing gaseous stream and liquid hydrocarbon product stream, passing the hydrogen containing stream to a second conversion zone providing an increase in hydrogen content and contacting such stream with subdivided catalyst particles at an elevated temperature and at a rate effecting the cracking of the hydrocarbon content of the gaseous stream into hydrogen and carbon, passing at least a portion of the hydrogen produced within the second conversion zone to a third conversion zone as at least a portion of the hydrogen being introduced thereto together with a second hydrocarbon charge stream and effecting a hydrogen consuming reaction therein to provide an improved hydrocarbon product stream, separating the resultant products from the third conversion zone to provide a normally gaseous hydrocarbon stream and at least one normally liquid hydrocarbon stream, passing at least a portion of such gaseous stream to said second conversion zone and at least a portion of the normally liquid hydrcarbon stream to the first said conversion zone as a portion of the charge thereto.

In a preferred combined processing system, embodying hydrogen producing and hydrogen consuming units, it is generally desirable to maintain a high purity to the hydrogen rich stream which is introduced to the hydrogen consuming units. Thus, it is advisable to continuously effect the removal of sulfur and nitrogen compounds which have been introduced into the system by the various charge streams. In a preferred operation of the present system, such contaminants are removed from the system by treating the gaseous and vaporous streams which are introduced into the fluidized high temperature cracking unit. Hydrogen sulfide may be removed, for example, by conventional means such as Girbotol unit, while ammonia may be removed by conventional means which may include acid washing or the passing of the mixture of gases through a cationic ion-exchange resin.

In the present description, the term "hydrogen consuming unit" is used in a generic aspect to refer to any hydrocarbon conversion process unit which utilizes hydrogen, normally in the presence of a catalyst, to aid in the enhancement of one or more hydrocarbon charge fractions, or to effect the conversion of one or more hydrocarbon fractions in a hydrogenating step, whereby to provide an improved more valuable product stream. For example, hydrogen may be passed in admixture with a hydrocarbon distillate stream into contact with a suitable refractory hydrocracking catalyst at a high temperature from about 500° to about 850° F. and at high pressure conditions of the order of 1000 pounds per square inch or more, to effect the selective cracking of the distillate stream into desired lower boiling fractions. A mixed hydrocarbon stream may be subject to hydrogenation to effect desulfurization and nitrogen compound removal and to provide a more saturated purified product stream useful as such fuel or for charge to another conversion unit. Suitable hydrogenation catalysts may comprise sulfur resistant composites of a cobalt, nickel, molybdenum compound or mixtures thereof on alumina.

Another process consuming small quantities of hydrogen may comprise the isomerization of butane, pentane and hexane fractions, or mixtures thereof, where such fractions are treated in the presence of an isomerization catalyst and hydrogen to provide high yields of desired isomerized fractions. The catalyst may comprise platinum containing solid particles, while operating conditions are generally relatively mild, with temperature in the range of from about 300° to 900° F. and pressure from 300 to 1000 pounds per square inch.

Another hydrogen consuming process comprises the hydrogenation of an aromatic stream, such as benzene to cyclohexane, with high conversions being obtained by passing the benzene stream together with hydrogen over a suitable hydrogenating catalyst at hydrogenating conditions, and as taught for example in U.S. Patent No. 2,755,317. Still another hydrogen consuming process comprises the hydrogenation-dealkylation of an aromatic fraction having a side chain to effect the removal of at least one side chain from such stream. For example, toluene may be subjected to a dealkylation step by passing toluene fraction together with hydrogen to a confined conversion zone maintaining a catalyst, such as chromia-alumina type catalyst, at a temperature above about 1200° F., as taught in U.S. Patent No. 2,951,886, whereby to produce high yields of benzene.

In a similar aspect the term "hydrogen producing" zone is used generically herein to encompass one or more hydrocarbon conversion zones which effect a net production of hydrogen in the conversion step. Such conversion step may comprise, for example, either high temperature thermal cracking, or catalytic cracking, where a high boiling charge stream is subject to cracking to effect the production of lower boiling more desirable fractions while at the same time effecting the cracking of a limited amount of the charge to gaseous fractions including a net production of hydrogen.

A dehydrogenation process also produces hydrogen, such as the dehydrogenation of normal propane, butane, pentane and hexane fractions, or mixtures thereof, to effect high yields of olefinic hydrocarbons and a net production of hydrogen. The dehydrogenation may be carried out at high temperatures in the range of 900° to 1200° F. and at slight superatmospheric pressures.

Still another hydrogen producing conversion process is the catalytic reforming of a naphtha or gasoline boiling range stream to produce improved octane number gasoline. Catalytic reforming is now widely used commercially, being carried out in a manner such as taught by U.S. Patent No. 2,479,110. Hydrogen produced from such units has been used in other processing operations, although not in the same manner as carried out by the improved integrated process of the present system.

Still other processing operations will be apparent to those familiar with the petroleum processing arts and it is not intended to limit the present invention to the use of the particular hydrogen producing and hydrogen consuming operations which have been set forth hereinabove. However, the present invention may be better explained and described and the scope better understood by reference to the accompanying diagrammatic drawing and the following description thereof.

Referring now to the drawing, there is indicated a line 1, having valve 2, suitable for passing a hydrocarbon charge stream to a hydrogen producing conversion process zone 3. Such zone is, of course, not shown in detail and may comprise one or more reactors, heaters, and accompanying apparatus whereby a particular conversion process may be effected, generally in the presence of a catalytic material. Hydrogen is admixed with the charge stream at the conversion zone 3 by means of line 4. As hereinbefore indicated, any one of several types of hydrocarbon conversion operations may be carried out; however, for purposes of illustration, it will be presumed that a straight-run naphtha or gasoline stream is being subjected to dehydrogenation or reforming in zone 3 to provide a higher octane improved gasoline stream. The conversion zone may actually comprise one or more reactors and accompanying heaters, pumps, exchangers, etc., suitable to effect a desired conversion and discharge an effluent stream of improved more valuable hydrocarbon fractions. The product stream is passed by way of line 5 to a separation zone 6 where various separation and fractionation steps may be employed to obtain desired product fractions by way of lines 7 and 8 as well as a hydrogen rich gaseous fraction. A portion of the hydrogen rich stream is shown as being used as recycle to the conversion step by way of the line 4 and control valve 9. A normally gaseous hydrocarbon and hydrogen containing stream that is separated at zone 6 is passed by way of line 10 and valve 11 to a sulfur and nitrogen compound removal zone 12. Such zone may comprise conventional stripping or absorption means suitable for removing hydrogen sulfide and ammonia from the gaseous stream.

The resulting treated stream from zone 12 is passed by way of line 13 to a riser line 14 and into admixture with heated catalyst particles being maintained in a reactor 15. In accordance with a preferred embodiment of the invention, there is indicated a fluidized contact of the resulting gaseous stream and the heated subdivided catalyst particles 53. There is a continuous introduction of the gaseous stream into the elongated reaction zone 15 maintaining a descending fluidized column or bed of catalyst. The catalyst particles are introduced into admixture with the hydrocarbon stream from the upper end of the reactor 15 which in turn receives the particles from the lower end of stripper section 16 at a temperature of about 1200° F. to about 1600° F. The contact effects a decomposition of the gaseous hydrocarbon fractions present to result in a product stream comprising primarily hydrogen with little or no formation of carbon oxides. A small amount of unconverted methane comprises the principal contaminant in the hydrogen stream passing overhead from the reaction zone 15 by way of line 17 and separator 18.

In the preferred embodiment using a fluidized operation, contacted carbonized catalyst particles from the lower portion of the fluidized column are continuously passed by line 19 and control valve 20 to a regenerator or carbon burning zone 21. In the latter, carbon is continuously removed from catalyst particles by burning in the presence of air or other oxygen containing stream (including carbon dioxide) being introduced by line 22 and valve 23 into the lower portion of regenerator 21. The oxygen content of the stream contacting the particles in the rising fluidized column is controlled to effect the burning of that amount of carbon that is continuously deposited on the particles and to effect a temperature sufficient to reheat the particles to in turn supply the endothermic heat of conversion in the reaction zone. Thus, the catalyst particles may be reheated to a temperature in the range of 1300° to 1800° F., whereby to effect the resulting high temperature decomposition of the hydrocarbon stream to hydrogen and carbon. A controlled oxygen content and controlled carbon level are also maintained in the regenerator 21 in order to provide the degree of carbon oxidation required to fulfill the thermal demands of the process.

Under most conditions the flue gas contains large percentages of carbon monoxide. A resulting carbon monoxide rich stream is discharged from the upper portion of the regenerator by way of line 24 and separator 25. A particle free stream passes from the separator 25 by way of line 26 to a carbon monoxide consuming zone 27. The latter may comprise a carbon monoxide burner or boiler suitable for producing a quantity of high temperature steam, or alternatively, the carbon monoxide may be utilized as a reducing stream for another processing operation, or to provide a source of carbon monoxide in the production of urea, formic acid and the like. The present drawing indicates a flue gas stream being discharged from the zone 27 by way of line 28 and valve 29 and water introduction through line 30 and valve 31, with steam discharged by way of line 32 and valve 33. An auxiliary line, not shown, may be used for recycling a carbon dioxide rich stream to the air line 22 and providing thereby a control of oxygen content to the regenerator. The admixture of carbon dioxide further serves to enhance the equilibrium production of greater quantities of carbon monoxide during the regeneration or the carbon burning step.

At the lower end of the separator zone 25 means is provided by line 34 for introducing the heated subdivided catalyst particles into the stripper zone 16. Hydrogen from the upper end of the reactor 15 passes into the stripping zone 16 so as to effect a countercurrent contact of the catalyst particles as they descend from the lower portion of the separator 25 to the stripper 16 and to the reactor 15. It has been found that the removal and stripping of carbon oxides and any metal contaminants which may become entrained with the particles from the burning zone should be removed prior to the introduction of the heated particles to the cracking zone so as to prevent any reducing operation taking place in the cracking zone and to in turn provide optimum yields of hydrogen with a minimum of carbon oxides being formed as contaminants to the hydrogen stream. The drawing indicates a countercurrent vapor stream and particle flow into and within the reactor 15; however, concurrent flow of vapors and subdivided particles may well be carried out in a suitably designed conversion zone within the scope of the present invention.

In the combined operation the hydrogen rich stream leaving the cracking reactor 15 is passed by way of line 35 with valve 36 to the hydrogen consuming zone 37 whereby to provide at least a portion of the necessary hydrogen for such conversion zone. In the present combined system, it is to be noted that the hydrogen producing reactor 15 may serve as a secondary source of hydrogen, with the primary source being provided by the hydrogen producing zone 3 and, further, excess hydrogen may be withdrawn from line 35 by way of line 38 and valve 39. The hydrocarbon charge to the zone 37 is introduced by way of line 40 with valve 41. The charge may, for example, comprise a gas-oil stream being subjected to hydrogenation for removal of sulfur and nitrogen compounds, as well as metal contaminants. The product stream from the hydrogen consuming conversion zone 37 is indicated as passing by way of line 43 to separation zone 44 wherein there is effected the necessary separation and fractionation of the effluent stream to provide at least one or more product streams at lines 45 and 46. There is also separated in the present embodiment a hydrogen containing gaseous stream by way of line 48 having valve 49.

A portion of the hydrogen rich stream from line 48 may be continuously recycled to the hydrogen consuming zone 37 by way of line 50 and valve 51; however, the net production of this light gaseous stream is passed by way of lines 48 and 13 to the hydrogen purifier-producing zone 15. Depending upon the types of conversion being effected in the respective hydrogen producing zone 3 and in the hydrogen consuming zone 37, there may be either a large or small quantity of hydrogen produced in zone 15 for use in these zones. In any event, this arrangement serves to utilize the high temperature decomposition zone 15 as a "hydrogen purifier" while at the same time, the hydrogen content of the stream is enhanced by the conversion of the light hydrocarbon components from both lines 10 and 48 with a resulting product stream obtained from the reactor 15 having an 85% hydrogen content or more. Sulfur and nitrogen compounds are removed in treating zone 12 prior to the streams being passed into contact with catalyst particles at the lower end of riser line 14. Such treating step precludes the building up of contaminating materials in the treating system. Auxiliary methane may be introduced to reactor 15 by way of line 14 and control 52, at any time additional hydrogen production is needed.

In another alternative operation, the combined system may make use of a product stream from the hydrogen producing zone 3 as a charge to the hydrogen consuming process zone 37. For example, an aromatic fraction, such as benzene or toluene, may be passed by way of line 8 and valve 42 to join with line 40 as the charge to the hydrogen consuming zone 37, whereby such aromatic fraction may be subject to hydrogenation to form a cycloparaffin, or alternatively, be subjected to dealkylation to remove a side chain therefrom.

As previously indicated, the present drawing is diagrammatic and does not show all pumps or compressors, valves, separating and fractionating equipment and the like, which may be advisable or necessary in the design of a commercial unit. The hydrogen consuming and hydrogen producing conversion operations may be carried out in batch operations, but preferably are effected in a continuous manner by the use of suitable reaction zones which in turn make use of fixed or fluidized beds of catalyst. Where necessary, suitable regeneration provisions may be provided to effect continuous or periodic reactivation of catalyst beds which may be used in such units.

In a combined operation having high hydrogen requirements, it may be necessary to provide an auxiliary charge of methane, or other hydrocarbon stream, to the hydrogen purifier-producing zone 15, such charge being introduced by way of valve 52 to the lower end of riser line 14, whereby high temperature decomposition will effect the production of an increased amount of hydrogen. On the other hand where the combined integrated system has a net production of hydrogen over and above that needed in the system, then excess hydrogen may be withdrawn from line 35 by way of line 38 and valve 39. Such hydrogen will be, as hereinafter noted, of substantial high hydrogen purity contaminated only with a small amount of methane and a very minor quantity of carbon oxides. Where desirable, the small amount of carbon oxides may be in turn eliminated by passing the product stream to a methanation zone and effecting the conversion of carbon monoxide and carbon dioxide to methane.

To illustrate still further the utility of the present improved combined system, the following examples set forth varying integrated combinations of conversion processes:

*Example I*

A naphtha stream is introduced by way of line 1 and valve 2 to hydrogen producing zone 3 and therein contacts a reforming catalyst at reforming conditions to provide an improved octane number product stream that is rich in aromatics. A hydrogen rich stream is separated and recycled to the hydrogen producing zone 3 while at the same time a light hydrocarbon gaseous fraction is separated and passed by way of line 10 to the treating zone 12 and to the cracking reactor 15 for the production of additional hydrogen. A high octane liquid product stream may be discharged from line 7. Also, there may be a separation to provide the removal of an aromatic fraction, as for example, by the use of a solvent extraction process that provides benzene, toluene, and xylene fractions. At least a portion of the benzene fraction is then withdrawn and passed by way of line 8 to provide charge to the hydrogen consuming process 37. In this zone the benzene fraction is subjected to hydrogenation in the presence of a suitable hydrogenation catalyst, such as a nickel compound composited on a siliceous support and in the presence of hydrogen being introduced by line 35, whereby the resulting hydrogenation provides a high yield of cyclohexane. The cyclohexane rich effluent stream is passed by way of line 43 to separation zone 44 where it is subjected to suitable separation and fractionation to provide a desired cyclohexane rich product stream at line 45 and at least a light gaseous fraction, which may contain some hydrogen. The latter is passed by way of line 48 to treating zone 12 and to the hydrogen producing zone for further hydrogen production, or to effect "purification," whereby there is an enhancement of hydrogen content to the streams being introduced to reactor 15 by way of both lines 10 and 48. The resulting hydrogen rich stream from reactor 15 passes by way of line 17 and line 35 to combine with the hydrogen from line 50 and in turn provide hydrogen utilized in the hydrogen consuming zone 37.

*Example II*

A gasoline boiling range material is charged to the hydrogen consuming zone 37 to effect the removal of sulfur, nitrogen and metal contaminants and to provide a suitable gasoline charge stream for a reforming operation in zone 36. Thus, the charge contacted in zone 37 as a temperature in the range of from about 500° to about 800° F. and at a pressure in the range of from about 200 to 1500 pounds per square inch over a sulfur resistant catalyst and in the presence of hydrogen to effect saturation and desulfurization, etc., of the charge. Catalysts suitable for such hydrogenation operation are well known in the industry, usually comprising one or more oxides of cobalt, molybdenum and nickel, on a suitable supporting material. The effluent product stream is separated at zone 44 to provide a naphtha or gasoline boiling range stream for reforming that is in turn passed by way of lines 46 and 1 to the hydrogen producing process zone 3. Such stream is converted therein, along with straight run or other gasoline range charge being introduced in line 1, in the presence of hydrogen and in the presence of a suitable reforming catalyst at a temperature of 700° to 1000° F. and at a pressure of 200 to 1000 pounds per square inch to produce an increased octane number gasoline stream. The catalysts for reforming are well known in the industry and may comprise platinum, palladium, or other noble metal on a suitable support such as alumina, together with an acid component, such as halogen or silica. One such catalyst is the Platforming catalyst now widely used in connection with the Platforming reforming process. The effluent stream from conversion zone 3 is subjected to separation and frictionation at zone 6 so as to provide a hydrogen rich stream, which may comprise 50% or more of hydrogen being discharged by way of line 4 to in turn provide at least a portion of the hydrogen used in zone 3. Also, a portion of the light normally gaseous fraction is discharged by way of lines 10 and 13 to the hydrogen purifier-producing zone 15. A resulting improved octane number gasoline is discharged by way of line 7 from separation zone 6.

At the secondary hydrogen producing unit 15, the light gaseous fractions which may contain some entrained or absorbed hydrogen, enter riser line 14 from lines 10 and 48 and therein contact heated catalyst at a temperature of from 1200° to 1600° F. and at a rate effecting the formation of hydrogen and carbon from a decomposition reaction. A resulting high hydrogen content stream from line 17 and line 35 is passed to line 40 to combine with the hydrocarbon charge. Where excess hydrogen is available, it is withdrawn from line 35 by way of line 38 and valve 39.

The removal of carbon and the reheating of the catalyst particles in the catalytic hydrogen producing zone is carried out as hereinbefore described in connection with the drawing, catalyst particles passing by way of line 19 to regenerating zone 21 and reheated activated catalyst particles passed from stripper 16 to the decomposition zone 15.

*Example III*

In an alternative to the operation set forth in Example I, a toluene rich stream is withdrawn from separation zone 6 and passed by way of line 8 to the hydrogen consuming process zone 37. The toluene stream will be therein subjected to contact with a suitable hydrodealkylation catalyst, such as, for example, chromia on alumina, at a temperature above about 1200° F.

The charge stream to zone 37 also contacts the catalyst in the presence of hydrogen from line 35 at a pressure of from 100 to 1000 pounds per square inch, effecting the removal of an alkyl radical to provide an effluent stream rich in benzene. The desired benzene stream may be withdrawn from separation zone 44 by way of line 45, while in a manner similar to the operations hereinbefore described, a low boiling gaseous hydrocarbon fraction is separated and passed by way of line 10 to the treating zone 12 and cracking reactor 15 for the production of an improved high hydrogen content effluent stream at lines 17 and 35. Excess hydrogen may be withdrawn from the system through line 38.

*Example IV*

As set forth in Example I, a naphtha stream is introduced by way of line 1 to the hydrogen producing zone 3 wherein there is effected the reforming of such stream in the presence of a reforming catalyst at reforming conditions to provide an improved octane number gasoline stream. The product stream is separated in zone 6 to provide an overhead hydrogen rich stream for recycle in line 4 and a normally gaseous hydrocarbon stream in line 10, while at the same time there is further separation effected to obtain normal $C_4$, $C_5$, and $C_6$ fractions. One or more of the fractions, or a mixture of such fractions, are passed by way of line 8 to the hydrogen consuming conversion zone 37 wherein there is effected the isomerization of the charge stream in the presence of an isomerizing catalyst. The isomerization catalyst in zone 37 may, for example, comprise a platinum compound on a solid support material such as alumina. The stream to be treated contacts the catalyst at a temperature of from about 300° to about 900° F. and at a pressure of from about 300 to about 1000 pounds per square inch, in the presence of hydrogen introduced from line 35.

A resulting isomerized product stream may be withdrawn from separation zone 44 by way of line 45 while a separated normally gaseous hydrocarbon fraction is passed overhead by way of line 48 to the treating zone 12 and to the hydrogen purifier-producing reactor 15 in accordance with the procedure described in the foregoing examples. In the present operation there is only a small consumption of hydrogen in the conversion zone 37 and as a result there is more hydrogen produced from the reforming separation zone 6 and from the high temperature cracking zone 15 than is necessary for use in the combined system. Thus, net hydrogen with a substantially high purity may be withdrawn from the combined system by way of line 38 and valve 39.

*Example V*

A hydrocarbon distillate stream, which may comprise a wide boiling range material with an I.B.P. of about 400° and a 900° F. E.P. is charged by way of line 1 to the hydrogen consuming unit 37. It is therein subjected to selective hydrocracking in the presence of hydrogen, introduced by way of line 35, and a hydrocracking catalyst contact at a temperature in the range of about 500° to about 850° F. and a superatmospheric pressure above about 1000 pounds per square inch. The catalyst may comprise a refractory support such as silica-alumina with an activating component comprising one or more oxides of the iron group of metals of Group VIII of the Periodic Table. In separation zone 44, the resulting hydrocracked effluent stream may be separated to provide lower boiling fractions including $C_3$, $C_4$, and $C_5$ components suitable for dehydrogenation in the hydrogen producing zone 3. A light gaseous overhead fraction is separated and passed by way of line 48 to treating zone 12 and then by way of lines 13 and 14 to the hydrogen producing reactor 15 whereby to effect the decomposition of hydrocarbon fractions contained therein to hydrogen and carbon. Hydrogen so produced is passed by way of lines 17 and 35 to the hydrogen consuming zone 37 to thus supply the necessary hydrogen for the hydrocracking conversion step.

One or more of the $C_3$ to $C_5$ fractions is passed by way of lines 46 and 1 to the conversion zone 3 wherein such fractions are subject to dehydrogenation in the presence of a dehydrogenating catalyst maintained at dehydrogenating conditions. The dehydrogenating catalyst in zone 3 may comprise, for example, a chromia-alumina catalyst and the hydrocarbon stream is passed at a temperature of from about 1000° to 1200° F. and at a slight superatmospheric pressure into contact with such catalyst. Resulting unsaturated products are passed to the separation zone 41 and therein subject to separation and fractionation to provide one or more product streams, as well as an overhead recycle hydrogen stream passing by way of line 4, and a normally gaseous hydrocarbon fraction passing by way of line 10 to treating zone 12 and to the high temperature decomposition reactor 15. Again, where excess hydrogen is provided by the system, such excess may be withdrawn by way of line 38.

*Example VI*

A hydrocarbon distillate stream, which again may comprise a wide range boiling material, is treated in the hydrogen consuming zone 37 to effect the hydrocracking thereof in the manner set forth in the foregoing Example V. At the same time a gas-oil stream, which may or may not be obtained from the separation zone 44, is introduced to the hydrogen producing zone 3 wherein there is effected a catalytic cracking of such gas-oil fraction to produce a marketable gasoline boiling range material. The gas-oil cracking may be substantially conventional, contacting a silica-alumina catalyst at a temperature of from about 800° to about 1000° F. and at a suitable rate of contact to provide desired high yields of gasoline boiling range material. The contact may be effected at low superatmospheric pressure in a fixed bed or in a fluidized catalyst operation. Both types of operation are widely used in the industry and it is not intended to limit the present combined process to any one type of contacting operation in this step. Separation is effected to provide one or more liquid product streams from zone 6, as well as to separate a light normally gaseous fraction which is passed overhead by way of line 10 to treating zone 12 and to the high temperature decomposition reactor 15, whereby hydrocarbon components in the stream may be converted to hydrogen and carbon in the manner heretofore set forth in the previous examples. A resulting hydrogen rich stream is passed by way of lines 17 and 35 to the hydrocracking conversion operation in zone 37. In connection with a cracking operation as set forth in this example, it is generally preferable to separate a single light gaseous hydrocarbon fraction to pass by way of line 48 to the hydrogen producing zone 15.

*Example VII*

A light or reduced crude charge is passed by way of line 1 to the conversion zone 3 and therein subjected to thermal cracking at an elevated temperature of from about 800° to about 1100° F. and a superatmospheric pressure above about 200 pounds per square inch. The resulting cracked fraction is separated in zone 6 to provide desired lower boiling liquid products as well as an overhead light gaseous fraction passed by way of line 10 to treating zone 12 and the high temperature decomposition reactor 15, whereby to effect the production of a hydrogen rich stream. A gasoline or naphtha fraction is obtained from separation zone 6 and is passed by way of line 8 to the hydrogen consuming zone 37 and is therein subjected to hydrogenation by contacting a suitable hydrogenating catalyst at hydrogenating conditions. There may be thus provided a resulting purified and desulfurized naphtha product stream suitable for use as such, or as charge to a catalytic reforming unit to produce a high octane gasoline. An overhead gaseous fraction is discharged from separation zone 44 by way of line 48 and passed to the treating zone 12 and the hydrogen producing zone 15 whereby resulting hydrogen is provided for use in the hydrogenation zone 37 by way of line 35. In this particular combined process, a hydrogen rich stream may be separated following the cracking carried out in zone 3; however, a preferred operation will generally separate a single light gaseous fraction from zone 6 to pass by way of line 10 into admixture with the gaseous fraction from line 49, whereby a single high hydrogen content stream is produced from the reactor 15 for use in the hydrogenation step being carried out in zone 37.

Still other hydrogen producing and hydrogen consuming operations and combinations in the present improved system will be apparent to those familiar with the petroleum processing arts.

We claim as our invention:

A conversion process which comprises,
  (1) subjecting a hydrocarbon stream heavier than gasoline to a hydrogen producing cracking reaction in a first conversion zone,
  (2) separating from the resultant products a normally gaseous stream containing hydrogen and light gaseous hydrocarbons and a liquid hydrocarbon fraction,
  (3) subjecting such hydrogen containing gaseous fraction in a second conversion zone to contact with subdivided heated catalyst particles at a temperature sufficient to decompose the major portion of the light hydrocarbons therein into hydrogen and carbon,
  (4) passing at least a portion of the hydrogen thus formed together with a gasoline charge stream to a third conversion zone and subjecting such charge to a hydrogen consuming hydrogenation reaction in said third zone, (5) separating from the resultant products of said third zone a normally liquid product stream and a normally gaseous hydrocarbon fraction, and
(6) passing at least a major portion of the latter to said second conversion zone along with the gaseous fraction resulting from said first conversion zone.

References Cited by the Examiner
UNITED STATES PATENTS
3,008,895 11/1961 Hansford et al. _____ 208—112

DELBERT E. GANTZ, *Primary Examiner.*
A. RIMENS, *Assistant Examiner.*